United States Patent
Thuries et al.

(10) Patent No.: US 8,245,936 B2
(45) Date of Patent: Aug. 21, 2012

(54) DYNAMIC FOCUS CALIBRATION, SUCH AS DYNAMIC FOCUS CALIBRATION USING AN OPEN-LOOP SYSTEM IN A BAR CODE SCANNER

(75) Inventors: Serge Thuries, Saint Jean (FR); Jean-Louis Massieu, Montauban (FR)

(73) Assignee: Intermec IP Corp., Everett, WA (US)

( * ) Notice: Subject to any disclaimer, the term of this patent is extended or adjusted under 35 U.S.C. 154(b) by 330 days.

(21) Appl. No.: 12/775,284

(22) Filed: May 6, 2010

(65) Prior Publication Data
US 2010/0314448 A1    Dec. 16, 2010

Related U.S. Application Data

(63) Continuation of application No. 11/747,139, filed on May 10, 2007, now abandoned.

(51) Int. Cl.
*G03B 3/10* (2006.01)
(52) U.S. Cl. .................................. 235/462.23
(58) Field of Classification Search ............ 235/462
See application file for complete search history.

(56) References Cited

U.S. PATENT DOCUMENTS

| | | | |
|---|---|---|---|
| 5,387,786 A | 2/1995 | Peng | |
| 5,574,598 A | 11/1996 | Koumura et al. | |
| 5,640,001 A | 6/1997 | Danielson et al. | |
| 5,783,811 A | 7/1998 | Feng et al. | |
| 5,864,128 A | 1/1999 | Plesko | |
| 5,929,980 A | 7/1999 | Yamaguchi et al. | |
| 6,123,264 A | 9/2000 | Li et al. | |
| 6,316,781 B1 | 11/2001 | Nagle et al. | |
| 6,347,742 B2 | 2/2002 | Winarski et al. | |
| 6,369,954 B1 | 4/2002 | Berge et al. | |
| 6,894,652 B2 | 5/2005 | Rawnick et al. | |
| 6,976,629 B2 | 12/2005 | Carlson | |
| 7,038,856 B2 | 5/2006 | Quake et al. | |
| 7,296,749 B2 | 11/2007 | Massieu | |
| 7,782,386 B2 | 8/2010 | Nishioka et al. | |
| 2005/0045725 A1 | 3/2005 | Gurevich et al. | |
| 2005/0218231 A1 | 10/2005 | Massieu | |
| 2005/0275742 A1 | 12/2005 | Baron | |

(Continued)

FOREIGN PATENT DOCUMENTS
JP    7105305    4/1995

OTHER PUBLICATIONS

Berge B., et al., "Variable Focal Lens Controlled by an External Voltage: An Application of Electrowetting," The European Physical Journal E, 3:159-163, 2000.

(Continued)

*Primary Examiner* — Michael G Lee
*Assistant Examiner* — Matthew Mikels
(74) *Attorney, Agent, or Firm* — Perkins Coie LLP

(57) ABSTRACT

A system and method for recalibrating a bar code scanner or other optical system is described. In some cases, the system dynamically adjusts the focal length of a lens assembly based on open-loop process, such as based on feedback related to a distance between the lens assembly and an imaged object. In some cases, the system dynamically adjusts the lens assembly in order to provide auto focusing or zoom adjustment.

27 Claims, 5 Drawing Sheets

U.S. PATENT DOCUMENTS

| | | | |
|---|---|---|---|
| 2007/0063048 A1* | 3/2007 | Havens et al. | 235/462.46 |
| 2008/0031610 A1 | 2/2008 | Border et al. | |
| 2008/0277477 A1 | 11/2008 | Thuries | |
| 2008/0277480 A1 | 11/2008 | Thuries | |

OTHER PUBLICATIONS

Chern, N., et al., "Practical Issues in Pixel-Based Autofocusing for Machine Vision," in Proceedings of the 2001 IEEE International Conference on Robotics and Automation, Seoul, Korea, May 21-26, 2001, pp. 2791-2796.

Love, G., "Adaptive Optical Components Using Liquid Crystal Devices," Journal of the Communications Research Laboratory, 46(3):427-430, Nov. 1999.

Keren, D., et al., "Restoring Subsampled Color Images," Machine Vision and Applications, 11:197-202, 1999.

Marino, B. et al., "Improving the Performance of Single Chip Image Capture Devices," Journal of Electronic Imaging, 12(2):209-218, Apr. 2003.

Ramanath, R., et al., "Demosaicking Methods for Bayer Color Arrays," Journal of Electronic Imaging, 11(3):306-315, Jul. 2002.

Schechner, Y., et al., "The Optimal Axial Interval in Estimating Depth From Defocus," Proceedings of the International Conference on Computer Vision, Kerkyra, 1999, pp. 834-838.

Subbarao, M., et al., "The Optimal Focus Measure for Passive Autofocusing and Dept-From-Focus," SPIE, vol. 2598, pp. 89-99.

Subbarao, M., et al., "Focusing Techniques," In Proceeding of the OE/Technology SPIE Conference, Boston, MA, Nov. 1992.

Vdovin, G., "Fast Focusing of Imaging Optics Using Micromachined Adaptive Mirrors," Apr. 1997, http://guernsey.et.tudelft.nl/focus/, accessed Jun. 21, 2005.

Wei, T-C, "Three Dimensional Machine Vision Using Image Defocus," dissertation, State University of New York, 1994.

Quilliet et al., "Electrowetting: A Recent Outbreak," Current Opinion in Colloid & Interface Science 6, 2001, 6 pages.

* cited by examiner

DYNAMIC FOCUS CALIBRATION, SUCH AS DYNAMIC FOCUS CALIBRATION USING AN OPEN-LOOP SYSTEM IN A BAR CODE SCANNER

CROSS REFERENCE TO RELATED APPLICATIONS

This application is a continuation application of U.S. patent application Ser. No. 11/747,139, filed May 10, 2007 entitled DYNAMIC FOCUS CALIBRATION, SUCH AS DYNAMIC FOCUS CALIBRATION USING AN OPEN-LOOP SYSTEM IN A BAR CODE SCANNER, which is related to commonly-assigned U.S. patent application Ser. No. 11/040,485, filed on Jan. 20, 2005, now U.S. Pat. No. 7,296,749 issued on Nov. 20, 2007 entitled AUTOFOCUS BARCODE SCANNER AND THE LIKE EMPLOYING MICROFLUIDIC LENS, and commonly-assigned U.S. patent application Ser. No. 11/747,149, filed concurrently herewith, entitled TEMPERATURE COMPENSATED AUTO FOCUS CONTROL FOR A MICROFLUIDIC LENS, SUCH AS AUTO FOCUS CONTROL FOR A MICROFLUIDIC LENS OF A BAR CODE SCANNER, both of which are hereby incorporated by reference.

BACKGROUND

Closed-loop systems generally employ a feedback component that assesses the operation of the system and modifies aspects of the system based on the operational assessment. One example of such a system is a typical bar code scanner having an auto focus control system. Being closed-loop, the auto focus control system maintains or modifies the focus of optical components by analyzing images captured by the system. These systems often require long response times in refocusing a lens system, as many control and/or measurement cycles are performed during the image analysis in order to accurately determine the correct focus measurement.

Currently, bar code scanners and other machine-readable symbol imagers utilize a variety of lens actuator systems to provide auto focus control. These scanners often have problems related to the speed of correcting optical components (as described) and in the accuracy of measurement (e.g., open-loop scanners without feedback components). These and other problems exist with respect to providing auto focus control in bar code scanners.

DETAILED DESCRIPTION

Described in detail below is a system of providing auto focus or other control for a lens system in a bar code scanner or other machine readable symbol imaging device using an open-loop control mechanism. In some examples, the system employs a lens having an electrowetting component, and actuates the lens using the electrowetting component. The system dynamically compensates for errors in focusing the device to an object, such as errors due to aging of the lens or of the device, environmental changes, drift, and other errors. Using a range finder that determines the distance between an object and the device, the system is able to determine a correction to apply to the focus of the lens in a single step. For example, the system may relate a measured distance with a current focused image and correct the focus of the image for that distance.

In some examples, the system may use the open-loop data taken from the range finder to calibrate or correct any focus transfer functions that focus or defocus the lens. The focus or defocus transfer functions may use parametric equations or look-up-tables to relate a determined error correction to a focus command.

In some examples, the system triggers calibration (or, recalibration) upon decoding errors or reading errors. The system may receive user input and trigger the calibration based on a user's request, or periodically or occasionally recalibrate, refresh, or change the transfer functions of the device (without being prompted by decoding errors and/or user input).

Various examples of the technology will now be described. The following description provides specific details for a thorough understanding and enabling description of these examples. One skilled in the art will understand, however, that the technology may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Suitable System

Figure 1:
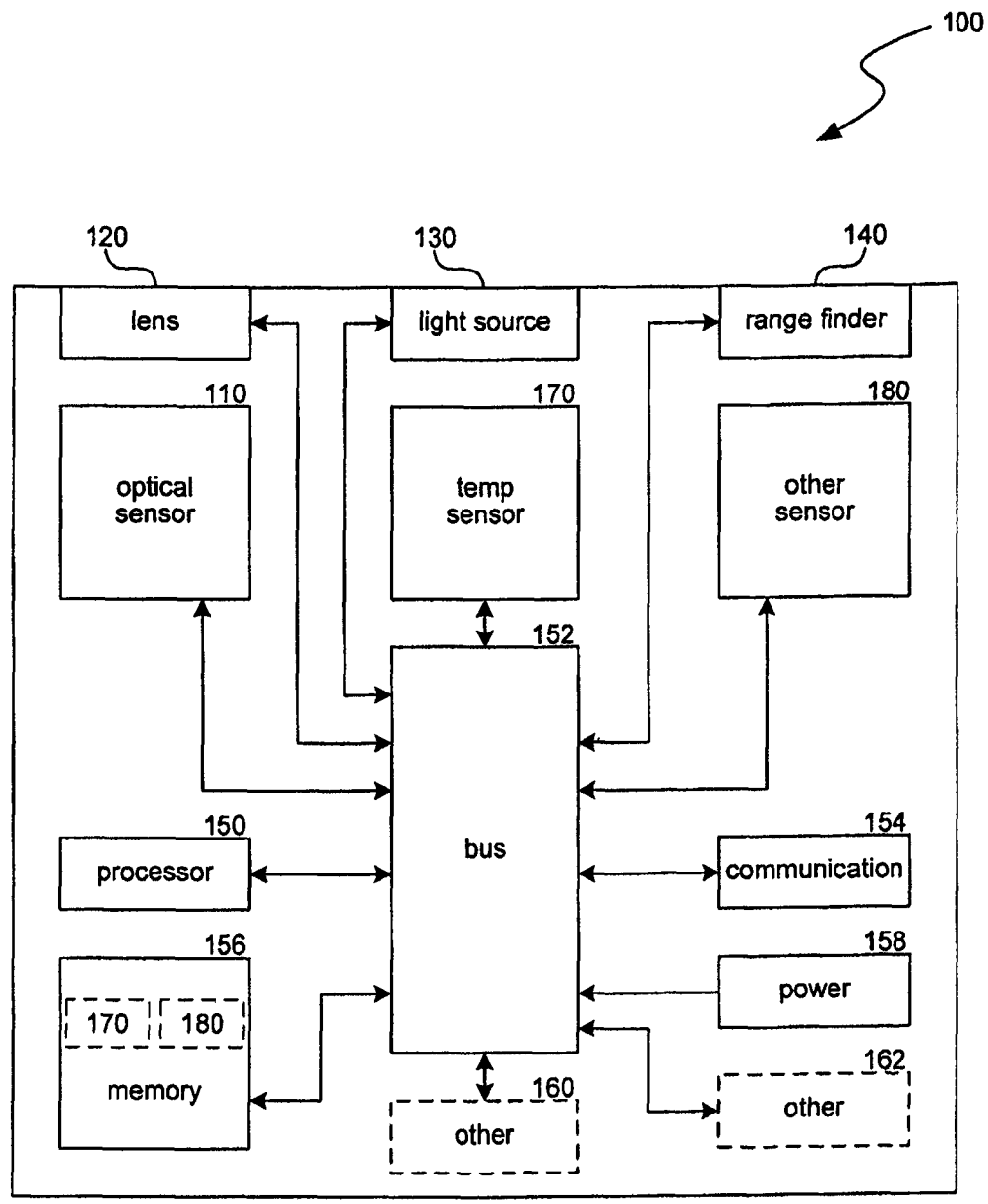
FIG. 1 is a block diagram illustrating example components of a machine readable symbol reader.

FIG. 1 and the following discussion provide a brief, general description of a suitable environment in which the technology may be implemented. Although not required, aspects of the technology are described in the general context of computer-executable instructions, such as routines executed by a general-purpose computer (e.g., hand-held scanner or imager, wireless device, mobile device, hand-held computer, digital camera, camcorder, and so on). Those skilled in the relevant art will appreciate that the technology can be practiced with other communications, data processing, or computer system configurations, including Internet appliances, other handheld devices (including personal digital assistants (PDAs)), all manner of cellular or mobile phones, embedded computers (including those coupled to vehicles), multi-processor systems, microprocessor-based or programmable consumer electronics, set-top boxes, network PCs, mini-computers, mainframe computers, and the like. Indeed, the terms "computer" and the like are generally used interchangeably and refer to any of the above devices and systems, as well as any data processor.

Aspects of the technology can be embodied in a special purpose computer or data processor that is specifically programmed, configured, or constructed to perform one or more of the computer-executable instructions explained in detail herein. Aspects of the technology can also be practiced in distributed computing environments where tasks or modules are performed by remote processing devices, which are linked through a communication network. In a distributed computing environment, program modules may be located in both local and remote memory storage devices.

Aspects of the technology may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the technology may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the technology reside on a server computer, while corresponding portions reside on a client computer, such as a hand-held scanning device.

Referring to FIG. 1, a block diagram illustrating example components of a machine readable symbol reader 100, such as a bar code scanner, is shown. The reader 100 may include an optical sensor 110 and a lens assembly 120, such as a microfluidic lens employing electrowetting principles. The lens and optical sensor may combine to receive images of an object, such as a bar code or other machine readable symbol (e.g., universal product codes and other linear bar codes, stacked bar codes, 2D bar codes, and so on). The lens assembly may also contain an auto focus system capable of receiving information and focusing, refocusing, or defocusing the lens to a desired focal length. In some cases, the system performs focusing via an actuator, such as a microfluidic lens actuator to be described herein.

The reader 100 may include a light source 130 to illuminate an object, and may include a range finder 140 to detect distances between the reader 100 and an object. The system may use information derived from the range finder to assist in focus control or other modifications.

The reader 100 may control components and/or the flow or processing of information or data between components using one or more processors 150 in communication with memory 156, such as ROM or RAM (and instructions or data contained therein) and the other components via a bus 152. Memory 156 may contain data structures or other files or applications that provide information related to actuation of the lens assembly. For example, memory 156 may contains one or more look-up-tables 170 or parametric equations 180 that relate open-loop based information (such as information measured by the range finder 140) with system information, such as focus or image information. The device 100 may use the look-up-tables 170 or parametric equations 180 stored in memory 156 as transfer functions that adjust, change or refresh transfer functions that control the actuator of the lens assembly.

Components of the system may receive energy via power component 158. Additionally, the system may receive or transmit information or data to other modules, remote computing devices, and so on via communication component 154. Communication component 154 may be any wired or wireless components capable of communicating data to and from reader 100. Examples include a wireless radio frequency transmitter, infrared transmitter (such as an RFID transmitter) or hard-wired cable, such as a USB cable. Reader may include other additional components 160, 162 not explicitly described herein, such as additional microprocessor components, removable memory components (flash memory components, smart cards, hard drives), and other components.

Additionally, reader 100 may include a temperature sensor 170 and/or other environmental or other sensors 180. For example, other environmental sensors may include humidity sensors, light sensors, pressure sensors, motion sensors, and so on. Other sensors may include an acceleration sensor (such as an accelerometer) that senses movement of the device, such as when a user shakes the device, inverts the device, and so on.

Temperature sensor may interact with lens 120 (and associated actuator system) via bus 152. The temperature sensor 170 may be a number of different sensors, including resistance thermometers, thermistors, thermocouples, silicon bandgap temperature sensors, and other electrical or mechanical sensors. Further details with respect to the temperature sensor are discussed in commonly-assigned U.S. patent application Ser. No. 11/747,149, filed concurrently herewith, entitled TEMPERATURE COMPENSATED AUTO FOCUS CONTROL FOR A MICROFLUIDIC LENS, SUCH AS AUTO FOCUS CONTROL FOR A MICROFLUIDIC LENS OF A BAR CODE SCANNER.

Figure 2:
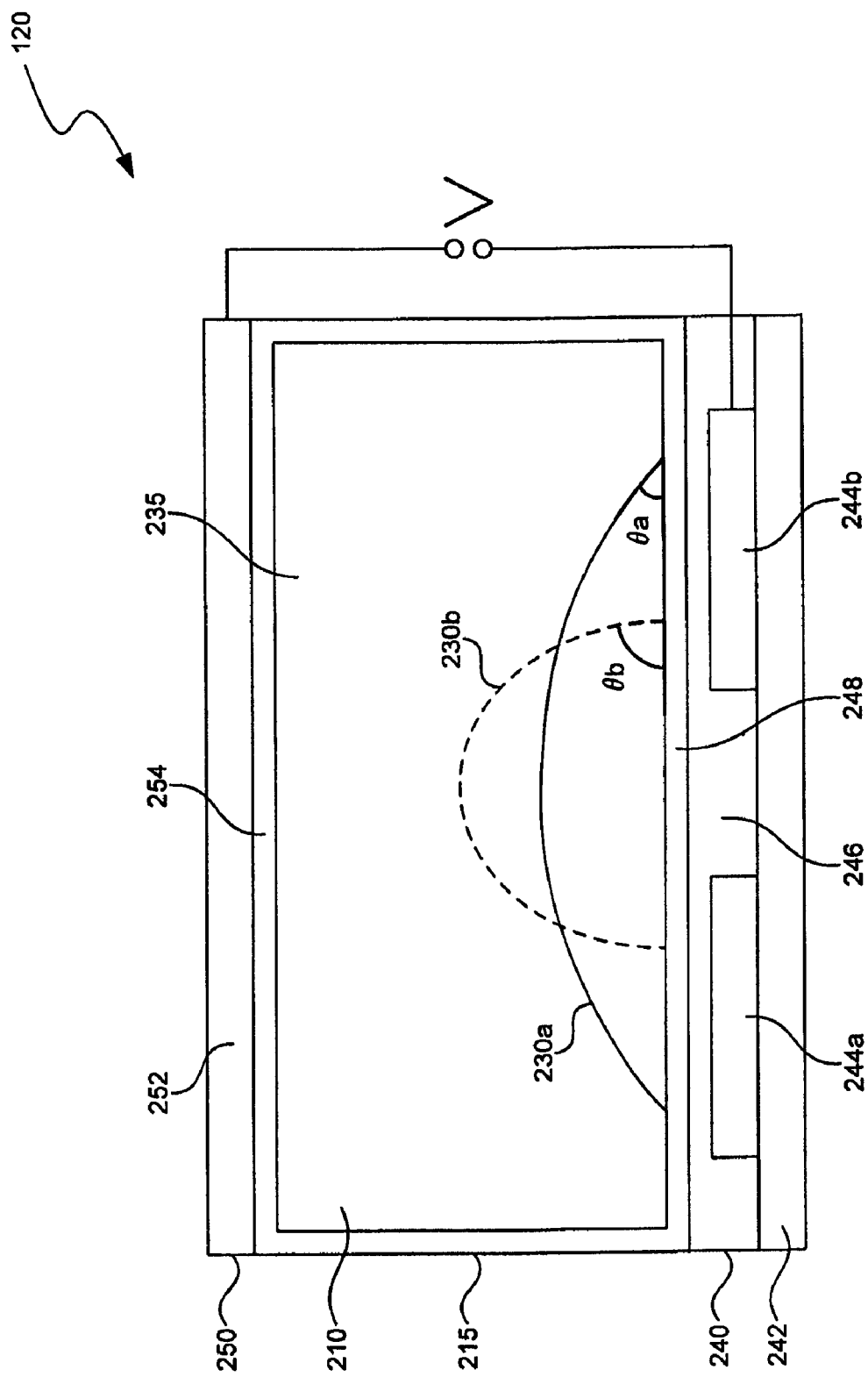
FIG. 2 is a block diagram illustrating an example lens assembly of the machine readable symbol reader.

As described herein, the system may perform auto focusing of the lens assembly 120 using a microfluidic lens actuator. Referring to FIG. 2, a block diagram illustrating an example lens assembly 120 of the machine readable symbol reader 100 is shown. Lens assembly 120 may include a cavity 210 or opening formed between opposing plates, including a bottom plate 240 and a top plate 250, and side plates 215. The cavity 210 may be filled with two immiscible liquids, such as a first liquid 230 and a second liquid 235. These liquids may have different refractive indices and be of a substantially similar density.

The bottom plate 240 may include a substrate 242, a plurality of electrodes 244a, 244b, a dielectric layer 246 that overlays the electrodes, and a hydrophobic layer 248 that provides an inner surface of bottom plate 240 in forming cavity 210. In some cases, the entire bottom plate 240 is transparent, although is some case only parts of the bottom plate 240 may be transparent. For example, the bottom plate may be formed of glass for the substrate), indium tin oxide, or ITO, for the electrodes, and a fluoropolymer for the hydrophobic layer. Other materials and configurations are of course possible.

The top plate 250 may include a substrate 252 (formed of glass or other transparent materials), and an electrode 254 (formed of indium tin oxide). As with the bottom plate 240, in some cases the top plate is formed of transparent materials and in some cases the top plate 250 may be only partially transparent.

Applying a voltage V to the electrodes (244a, 244b of the bottom plate and 254 of the top plate) causes a first potential to be applied to the first liquid 230 and a second potential to be applied to the second liquid 235. Under the principles of electrowetting, the applied voltage causes the contact between the first liquid and the hydrophobic layer to become less hydrophobic, and liquid 230 may change shape, moving from shape 230b to shape 230a. That is, a contact angle $\Theta_a$ between the liquid as shape 230a and the layer 258 is much smaller than a contact angle $\Theta_b$ between the liquid as shape 230b and the layer 258.

Using these principles, a simple application of voltage to the lens assembly electrodes changes the shape of liquid 230, effectively changing the focus of the lens assembly. Thus liquid 230 acts as the lens, and the system applies a voltage to the liquid to modify the lens and accurately focus an image of an object to the optical sensor 110 using liquid 230 as the lens. Further details with respect to the lens assembly 120 may be found in commonly-assigned U.S. patent application Ser. No.

11/040,485, filed on Jan. 20, 2005, entitled AUTOFOCUS BARCODE SCANNER AND THE LIKE EMPLOYING MICROFLUIDIC LENS.

For example, in order to accurately read a bar code or other machine readable symbol (an object), the system may require an accurate or clear image of the bar code to be placed on the optical sensor. Using the Gaussian Lens Equation:

$$1/f=1/p+1/p'$$

(where f is the focal length of the lens assembly, p is the lens to image distance, and p' is the lens to object distance), the image distance, or p, depends on an accurate focal length of the lens assembly, as the only other variable is the lens to object distance. Thus, modifying the focal length f of the first liquid (in effect, changing the curvature of the liquid) using the electrowetting principles described above allows the system to modify the image distance p, enabling the system to place the image onto the optical sensor 110 with sufficient accuracy. Therefore, because the system may rely on the liquid lens for focusing, the system should be able to compensate for factors that affect the microfluidic lens assembly 120, as the microfluidic lens controls the focal length of the lens.

In some examples, in addition to a microfluidic lens component, the lens assembly may contain a number of stacked lens components (such as stacked transparent plastic lenses, glass lenses, Fresnel diffractive components, and so on) having with the liquid lens an approximately infinite best focus distance. These lens components may provide an initial optical power for the lens assembly. The system then uses the microfluidic lens component to shorten the focal length of the lens assembly (in some cases to 10 centimeters or smaller). Thus, the assembly provides the system with high optical power using the stacked lens components and accurate focusing the microfluidic lens component.

Alternatively, or additionally, the system may employ other optical components when focusing the lens assembly. In some cases, the system may use a translational optical stage, nematic liquid lens, deformable mirror, and so on.

Figure 3:
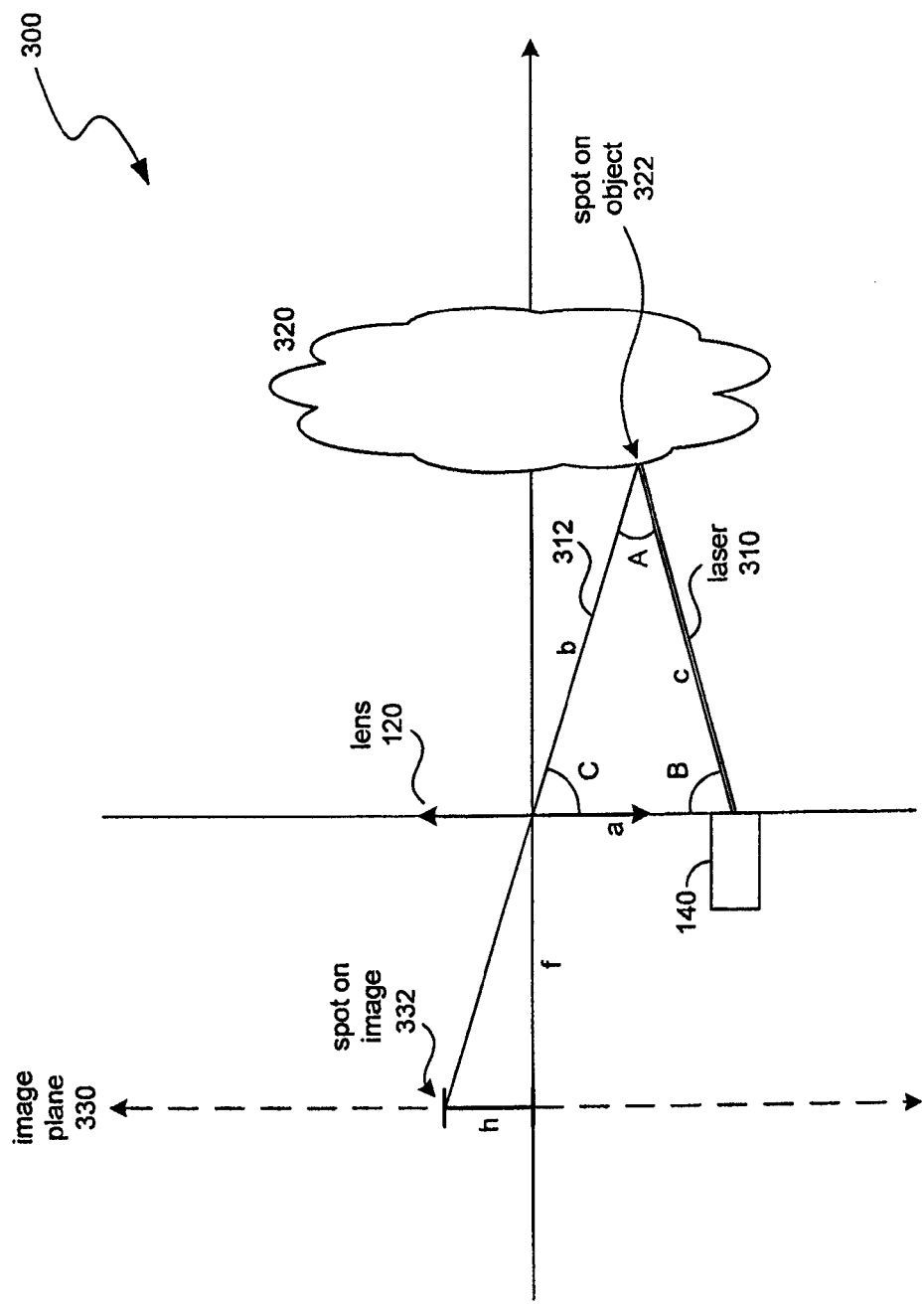
FIG. 3 is a schematic diagram illustrating operation of the range finder.

As described herein, the system may perform auto focusing of the lens based on open-loop information received from the range finder 140. Referring to FIG. 3, a schematic diagram 300 illustrating operation of the range finder is shown. Using triangulation methods, the range finder 140 first emits a beam of light, such as a laser beam or infrared beam towards a spot 322 on an object 320. The object sends a reflected image 312 back towards the lens assembly 120 of the device, and places the image of the spot 332 at a certain height (h) of the image plane 330 within the lens assembly, where the image plane is at a known distance (f) from the front of the lens assembly 120.

In some cases, the length (c) of the emitted beam 310 to the object, the length (b) of the reflected beam 312 to the lens assembly 120, and the length (a) between the lens assembly 120 and the range finder (140) form the sides of a triangle having complementary angles C, B, and A, respectively. Using the Law of Sines and some known values based on device specifications, the length b may be realized and the distance from the spot 322 on the object 320 to the lens assembly 120 may be determined.

For example, if the following values are known:
a=10 mm
f=16 mm
h=2 mm
C=90 degrees−tan$^{-1}$(h/f)=83 degrees
B=85 degrees
A=180 degrees−C−B=12 degrees The value for b may be found using the Law of Sines:

$$(\text{Sin } B/b)=(\text{Sin } A/a), \text{ where } b=\sim 50 \text{ mm, or 5 cm.}$$

Thus, using the range finder and triangulation, the system is able to determine the distance from the spot on the image 322 to the lens assembly 120 using an open-loop process. Given the measured distance, the system may be able to calibrate the lens assembly (or correct a zoom value) by relating the distance to an image produced at that distance by the object or by a section of the object. Further details will be discussed herein.

Of course, the system may employ other methods to determine the distance using open-loop methods. The system may transmit other types of waves, such as sound waves, electromagnetic waves, infrared waves, and so on.

Dynamically Calibrated Focus Control

Figure 4:
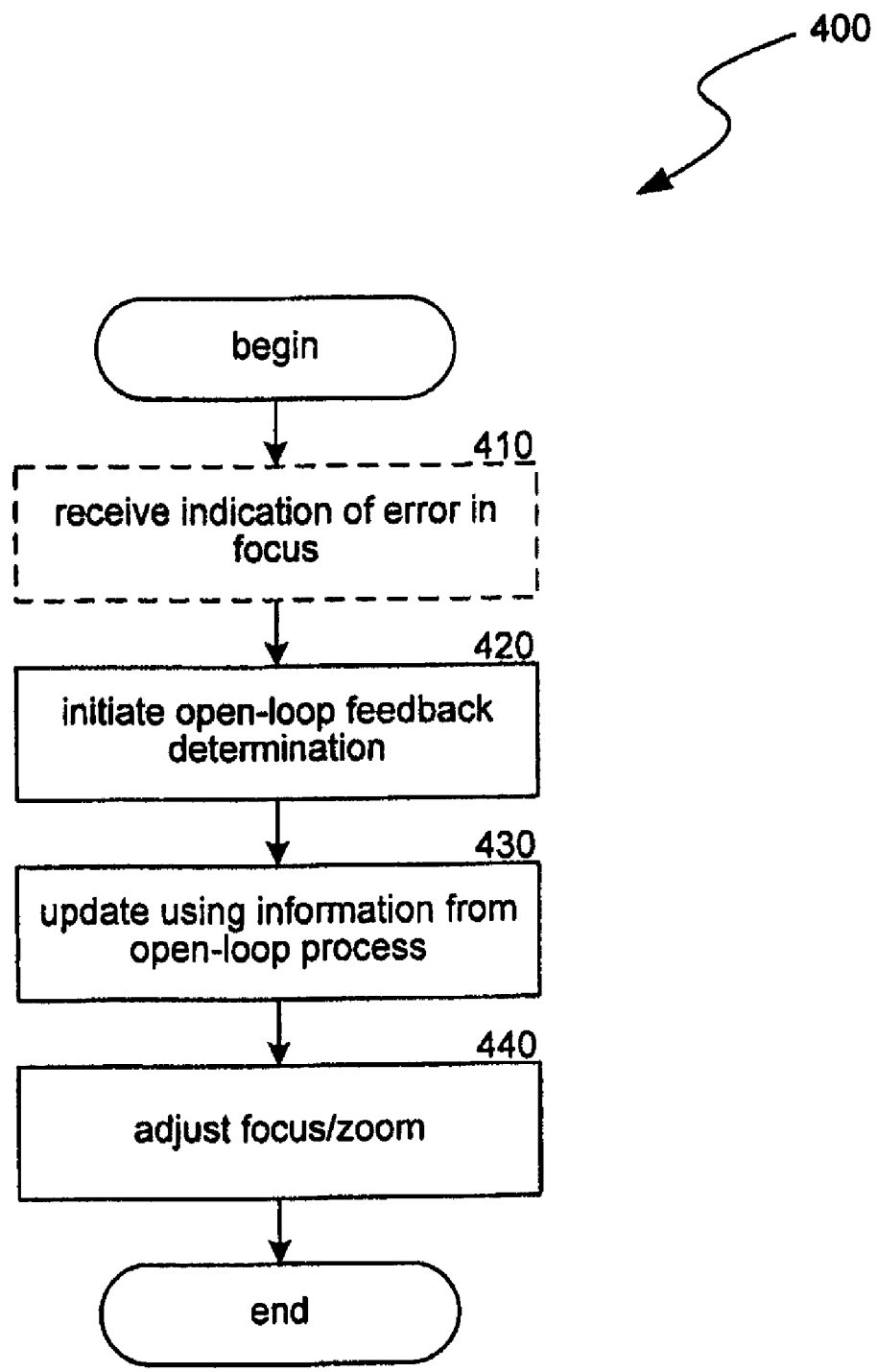
FIG. 4 is a flow diagram illustrating a routine for correcting the focus of the lens assembly.

The system may dynamically measure the distance between an object and the device, and, therefore, dynamically calibrate or recalibrate transfer functions that drive the focus actuator of the lens assembly. Referring to FIG. 4, a flow diagram illustrating a routine 400 for correcting the focus of the lens assembly is shown. Routine 400 may reside, for example, in memory 156 of the device, and run in processor 150 or other components specific to the recalibration of the lens assembly 120 (such as in control components of the lens assembly 120)

In step 410, the system may optionally receive an indication of a decoding error in imaging an object, such as in reading a barcode, or an image acquisition query. For example, the system may receive a number of error messages indicating a failure to decode an image of an object. The system may also periodically or occasionally initiate a recalibration process. In step 420, the system initiates an open-loop control process, such as a process to determine the distance from the lens assembly of the device to the object. The system may initiate the open-loop control process after receiving a single decoding error message, or after receiving a predetermined number of error messages, such as a number above a threshold number of messages. Additionally, the system may receive a manual indication from a user of the device to initiate the routine 400.

In step 430, the system determines any error using the open-loop process. For example, the system uses the range finder to determine the distance to the object, and relates the distance to a predetermined better focus position of the lens actuator of the lens assembly. In step 440, the system corrects the focus of the device, such as by correlating the measured distance with the better focus position and updating the command or commands that control the focusing and defocusing of the lens assembly.

In some cases, should routine 400 not correct the focus to an acceptable level, the system may proceed with other processes to correct the focus, such as closed-loop processes that compare images received by the device.

Figure 5:
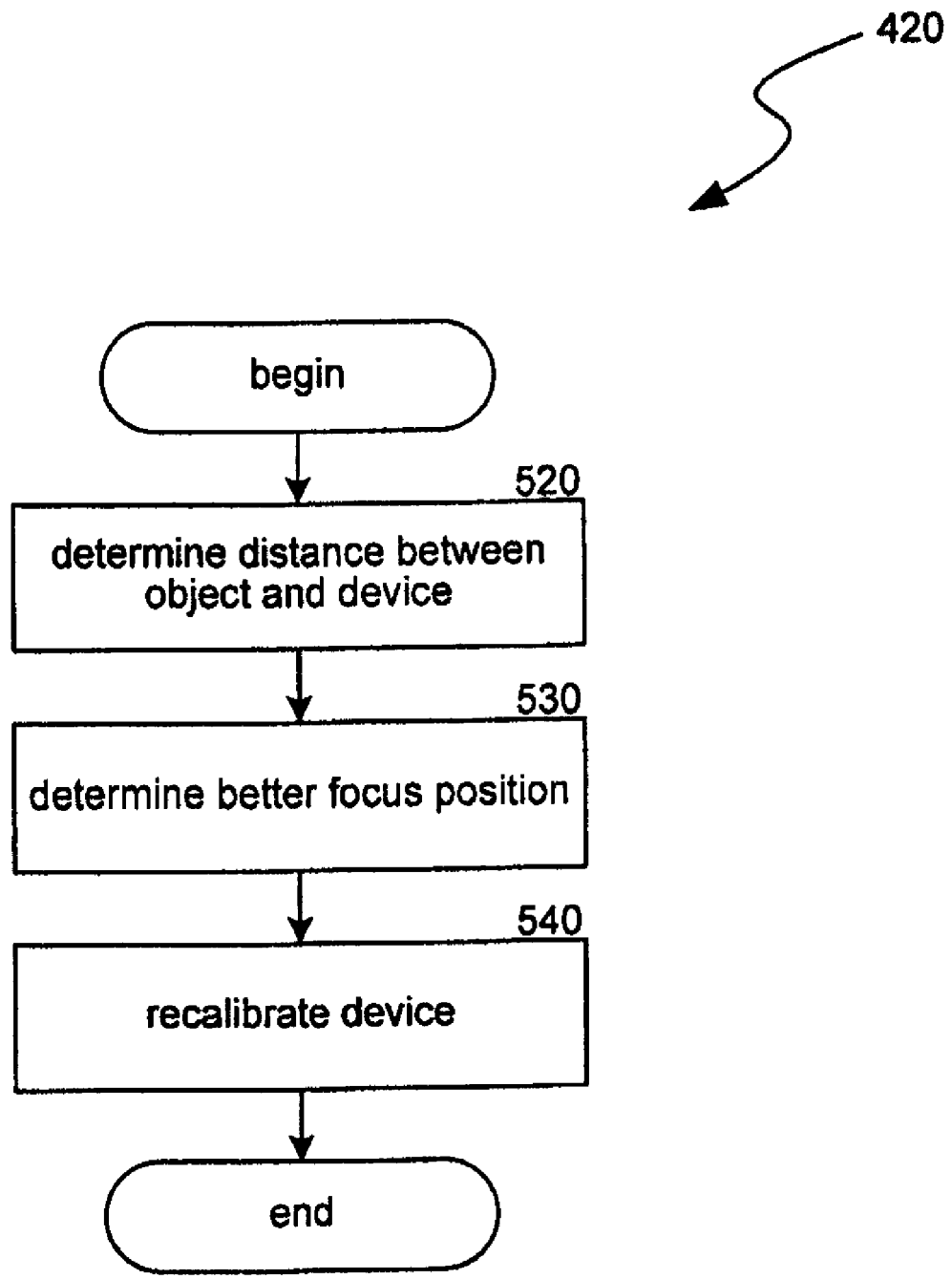
FIG. 5 is a flow diagram illustrating a routine for determining a focus correction of a lens assembly.

The system may use the open-loop processes described herein in collaboration with passive focusing algorithms in order to recalibrate the device. Referring to FIG. 5, a flow diagram illustrating a routine 420 for determining a focus correction is shown. For example, the system receives information related to a decoding error in reading an object with the device, or related to a periodic adjustment or recalibration of the device. Upon receiving the decoding error or adjustment signal, the system, in step 520, measures the distance between the object and the lens assembly. For example, the system employs a range finder and the triangulation methods described herein to measure the distance to the object.

In step 530, the system determines a better or adjusted focus position (such as the best focus position). In some cases, the system uses passive focus algorithms that analyze the image content, such as by maximizing the Sum Modulus Difference of the image. Further details with respect to the determining the better focus position may be found in commonly-assigned U.S. patent application Ser. No. 11/040,485, filed on Jan. 20, 2005, entitled AUTOFOCUS BARCODE SCANNER AND THE LIKE EMPLOYING MICROFLUIDIC LENS.

The system may move the lens assembly forwards and backwards (effectively changing the focal length of the lens assembly) to determine the best focus position from the images received due to the movement. The system then compares the different received images, such as comparing amplitudes of the images and determining the peak of the amplitudes. As described herein, the system may only image a few positions of an object and perform the analysis using imaged positions of the object.

In step 540, the system dynamically recalibrates the distance to focus transfer function using a determined adjusted focus position and the measured distance. For example, the system refreshes look-up-tables, parametric equations, or other algorithms or mathematical functions that control actuation of the focus of the lens assembly.

In some cases, the system may perform routine 420 multiple times, in order to determine an acceptable adjusted focus position for a number of different distances between the object and the lens assembly, and recalibrate the device based on the multiple determinations. The system may perform multiple recalibration routines due to the degree of error (such as due to the drift), due to the equations and/or look-up-tables controlling the focusing of the device, due to expected or future calibrations, due to increasing the accuracy of the recalibration, and other reasons.

Additionally, in some examples the system may use dynamically refocusing with other open-loop processes, such as with the temperature focus compensation process described in commonly-assigned U.S. patent application Ser. No. 11/747,149, filed concurrently herewith, entitled TEMPERATURE COMPENSATED AUTO FOCUS CONTROL FOR A MICROFLUIDIC LENS, SUCH AS AUTO FOCUS CONTROL FOR A MICROFLUIDIC LENS OF A BAR CODE SCANNER. For example, the system may use the open-loop temperature or other environmental compensation processes to determine the better focus position, and use the range finder to determine the measure distance. Thus, the system may dynamically recalibrate the device only using open loop processes.

The system may attempt to recalibrate the device based on numerous indicators. For example, the system may begin recalibration after receiving error indicators, or may recalibrate periodically. For example, the system may recalibrate the device based on time indicators (e.g. once a month, everyday), every time the device is powered on or powered off, or based on user input indicators (the user presses a recalibrate button, a non-savvy user shakes the device in an effort to "fix" the device and triggers an acceleration sensor, and so on).

Additionally, the system may alert the user when the device is in recalibration mode, such as by blinking a light, providing information to the user via a user interface, beeping or performing other audible indicators, and so on.

In addition to bar code and other symbol readers, the system may employ the methods described herein to adjust a zoom value of other imaging devices, such as the zoom value for a camera, camcorder, and so on.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the technology is not intended to be exhaustive or to limit the technology to the precise form disclosed above. While specific embodiments of, and examples for, the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the technology in light of the above Detailed Description. While the above description describes certain embodiments of the technology, and describes the best mode contemplated, no matter how detailed the above appears in text, the technology can be practiced in many ways. Details of the data collection and processing system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless the above Detailed Description section explicitly defines such terms. Accordingly, the actual scope of the technology encompasses not only the disclosed embodiments, but also all equivalent ways of practicing or implementing the technology under the claims.

While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A method of dynamically recalibrating a bar code reader, the method comprising:
   reading data from multiple bar codes;
   while reading data from multiple bar codes, receiving a recalibration signal or an indication of an error in reading an image of a bar code imaged by the bar code reader using a lens assembly calibrated to focus using a first focal length for reading the bar code, wherein the bar code reader employs open-loop auto focus controls;
   in response to the recalibration signal and while reading data from multiple bar codes, measuring a distance between the bar code and a lens assembly in the bar code reader, wherein the distance is measured with a range finder carried by the bar code reader;
   determining a second focal length of the lens assembly that provides a better image of the bar code; and
   while reading data from multiple bar codes, recalibrating the open-loop auto focus controls of the bar code reader using the determined second focal length and the measured distance, and without need for a calibrated test system,
   wherein recalibrating the open-loop auto focus controls includes—
      adjusting the open-loop auto focus controls by updating a transfer function of the bar code reader stored in a memory to correct focusing errors of the bar code reader present at a time of reading the image of one of the multiple bar codes,
      wherein subsequent focal lengths used by the bar code reader to read subsequent images of bar codes automatically correct for the focusing errors until another dynamic recalibration of the bar code reader occurs, and
   wherein the recalibrated open-loop auto focus controls are used for reading a subsequent image with the bar code reader.

2. The method of claim 1, wherein measuring the distance between the bar code and the lens assembly comprises triangulating an output signal of the range finder.

3. The method of claim 1, wherein recalibrating the bar code reader comprises adjusting a look-up-table with the determined second focal length and the measured distance and applying the look-up-table to an actuator of the lens assembly that controls the focal length of the lens assembly.

4. The method of claim 1, wherein recalibrating the bar code reader comprises adjusting a parametric equation based at least in part on the determined second focal length and the measured distance and applying a parametric equation to an actuator of the lens assembly that controls a focal length of the lens assembly.

5. The method of claim 1, further comprising:
   measuring a second distance between the bar code and the lens assembly in the bar code reader, wherein the second distance is measured from a different position with respect to the bar code; and
   determining a third focal length of the lens assembly that provides a better image of the bar code than the first focal length;
   wherein recalibrating the bar code reader comprises using at least in part the third focal length and the measured second distance.

6. The method of claim 1, wherein receiving a recalibration signal or an indication of an error comprises failing to decode the image of the bar code.

7. The method of claim 1, wherein receiving a recalibration signal or an indication of an error comprises receiving the recalibration signal or the indication from a user of the bar code reader.

8. The method of claim 1, wherein receiving a recalibration signal or an indication of an error comprises receiving the recalibration signal or the indication from an environmental sensor that measures characteristics of a location of the bar code reader.

9. The method of claim 1, wherein receiving a recalibration signal or an indication of an error comprises receiving the recalibration signal or the indication from a temperature sensor that measures the temperature of the lens assembly of the bar code reader.

10. The method of claim 1, wherein receiving a recalibration signal or an indication of an error comprises receiving the recalibration signal or the indication from an acceleration sensor that senses that a user of the bar code reader is shaking the reader.

11. The method of claim 1, wherein receiving a recalibration signal or an indication of an error comprises automatically receiving the recalibration signal or the indication at a preset time.

12. A hand-held device configured to use dynamic recalibration to take an image of an object, comprising:
   a memory for storing open-loop auto focus controls;
   a lens assembly having an adjustable focal length for reading images of multiple selected objects, wherein the open-loop auto focus controls adjust the focal length;
   a range finder, wherein the range finder determines a distance between the hand-held device and a position on a selected object;
   an operation monitoring component, wherein the operation monitoring component receives an adjustment signal and initiates an adjustment of the focal length during the reading of images of the multiple selected objects; and
   a dynamic adjustment component coupled to the lens assembly and to the range finder,
   wherein the dynamic adjustment component adjusts the focal length of the lens assembly based on
      a) information received from the range finder and
      b) based on the received signal from the operation monitoring component
      to provide an improved image of one of the multiple selected objects and without need for a calibration test system, and
   further wherein the dynamic adjustment component recalibrates the open-loop auto focus controls using
      a) the adjusted focal length and
      b) the information received from the range finder
      to update a transfer function of the hand-held device stored in the memory to correct for focusing errors of the hand-held device present at a time of reading the image of one of the multiple selected objects and to adjust the open-loop auto focus controls,
      wherein subsequent focal lengths used by the hand-held device to read subsequent images automatically correct for the focusing errors until another dynamic recalibration of the hand-held device occurs.

13. The device of claim 12, wherein the lens assembly comprises a liquid whose shape is determined based on a voltage applied to the liquid.

14. The device of claim 13, wherein the lens assembly includes:
a bottom plate, wherein the bottom plate includes a substrate layer, one or more electrodes, and a hydrophobic layer that provides a surface for the liquid; and
a top plate, wherein the top plate includes a substrate layer and an electrode;
wherein the bottom plate and top plate form a cavity that contains the liquid.

15. The device of claim 13, wherein the lens assembly includes:
an adjustable lens component containing the liquid; and
one or more additional lens components configured to provide a substantially infinite focus distance.

16. The device of claim 12, wherein the dynamic adjustment component changes the transfer function that controls the focal length of the lens assembly.

17. The device of claim 12, wherein the dynamic adjustment component changes one or more look-up-tables that control the focal length of the lens assembly.

18. The device of claim 12, wherein the dynamic adjustment component changes one or more parametric equations that control the focal length of the lens assembly.

19. The device of claim 12, further comprising:
a focus optimization component, wherein the focus optimization component determines an optimum focus of the lens assembly by analyzing an image of the selected object;
wherein the dynamic adjustment component adjusts the focal length of the lens assembly at least in part based on information received from the focus optimization component.

20. The device of claim 12, further comprising:
a focus optimization component, wherein the focus optimization component determines an optimum focus of the lens assembly;
wherein the dynamic adjustment component adjusts the focal length of the lens assembly at least in part based on information received from the focus optimization component.

21. The device of claim 12, wherein the adjustment signal is related to an error detected in operation of the device.

22. The device of claim 12, wherein the adjustment signal is related to a periodic calibration of the device.

23. The device of claim 12, wherein the operation monitoring component is configured to periodically initiate the adjustment of the focal length.

24. The device of claim 12, wherein the operation monitoring component is configured to receive input from a user of the device.

25. A system for dynamically recalibrating a bar code reader, the method comprising:
means for receiving an indication of an error in reading an image of a machine readable code imaged by the bar code reader using a lens assembly calibrated at a focal length and while gathering data from multiple machine readable codes;
means for measuring a first distance and a second distance, wherein the first distance is a distance between a first position on a machine readable code and a lens assembly in the bar code reader and the second distance is a distance between a second position on the machine readable code and the lens assembly;
means for determining an alternate focal length of the lens assembly that provides an adjusted image of the machine readable code; and
means for recalibrating the bar code reader using the determined alternate focal length and the measured distances without use of a calibration test system,
wherein recalibrating the bar code reader occurs while reading data from multiple machine readable codes and includes
storing in a memory
a) the determined alternate focal length and
b) the measured distances, and
adjusting a stored transfer function of the bar code reader to compensate for focusing errors of the bar code reader present at a time of reading the image of one of the multiple the machine readable codes,
wherein subsequent focal lengths used by the bar code reader to read subsequent images automatically compensate for the focusing errors until another dynamic recalibration of the bar code reader occurs, and
wherein the determined alternate focal length and the measured distances are used for reading a subsequent machine readable code with the bar code reader.

26. A machine readable symbol reader configured to use dynamic recalibration to image a machine readable symbol, comprising:
a memory for storing open-loop auto focus controls;
a lens assembly having an adjustable focal length for imaging each of multiple machine readable symbols, wherein the open-loop auto focus controls adjust the focal length for imaging each of the multiple machine readable symbols;
an open-loop measurement component, wherein the open-loop measurement component determines a distance between the machine readable symbol reader and a position on each of the multiple machine readable symbols;
a focus adjustment component, wherein the focus adjustment component determines an adjusted focus of the lens assembly; and
a dynamic adjustment component coupled to the lens assembly and open-loop measurement component,
wherein the dynamic adjustment component adjusts the focal length of the lens assembly based on
a) one or more determined distances and
b) one or more focus adjustments
to provide a better image of the selected machine readable symbol and to compensate for focusing errors of the reader present at a time of imaging multiple machine readable symbols, and without need for a calibration test system,
wherein subsequent focal lengths used by the machine readable symbol reader to image subsequent machine readable symbols automatically compensate for the focusing errors until another dynamic recalibration of the machine readable symbol reader occurs, and
further wherein the dynamic adjustment component recalibrates the open-loop auto focus controls using the adjusted focal length and the one or more determined distances by updating a transfer function stored in the memory to adjust the open-loop auto focus controls while reading data from multiple machine readable symbols.

27. The reader of claim 26, wherein the open-loop measurement component comprises a range finder carried by the reader.

* * * * *

UNITED STATES PATENT AND TRADEMARK OFFICE
CERTIFICATE OF CORRECTION

PATENT NO. : 8,245,936 B2
APPLICATION NO. : 12/775284
DATED : August 21, 2012
INVENTOR(S) : Serge Thuries et al.

It is certified that error appears in the above-identified patent and that said Letters Patent is hereby corrected as shown below:

In the Specifications:

In column 5, line 35, Before "the" insert -- using --.

In column 6, line 27, Delete "120)" and insert -- 120). --, therefor.

In the Claims:

In column 12, line 15, before "machine" delete "the".

Signed and Sealed this
Twenty-first Day of May, 2013

Teresa Stanek Rea
*Acting Director of the United States Patent and Trademark Office*